(12) United States Patent
Yamaguchi

(10) Patent No.: US 10,286,790 B2
(45) Date of Patent: May 14, 2019

(54) CHARGE CONTROLLER FOR VEHICLE

(71) Applicant: DENSO CORPORATION, Kariya, Aichi-pref. (JP)

(72) Inventor: Kazuhiko Yamaguchi, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 368 days.

(21) Appl. No.: 14/445,563

(22) Filed: Jul. 29, 2014

(65) Prior Publication Data

US 2015/0035486 A1 Feb. 5, 2015

(30) Foreign Application Priority Data

Jul. 30, 2013 (JP) .................................. 2013-158321

(51) Int. Cl.
*B60L 11/18* (2006.01)
*B60L 1/00* (2006.01)
(Continued)

(52) U.S. Cl.
CPC ........... *B60L 11/1816* (2013.01); *B60L 1/003* (2013.01); *B60L 3/0069* (2013.01); *B60L 3/04* (2013.01); *B60L 3/12* (2013.01); *B60L 11/14* (2013.01); *B60L 11/1805* (2013.01); *B60L 11/1824* (2013.01); *B60L 11/1838* (2013.01); *B60L 11/1846* (2013.01); *B60L 11/1861* (2013.01); *B60L 15/2045* (2013.01); *B60L 2240/34* (2013.01); *B60L 2240/622* (2013.01); *B60L 2240/80* (2013.01); *B60L 2250/16* (2013.01);
(Continued)

(58) Field of Classification Search
CPC ..... B60L 11/1816; B60L 11/1838; B60L 3/12
USPC ......................................................... 320/109
See application file for complete search history.

(56) References Cited

U.S. PATENT DOCUMENTS 5,349,535 A 9/1994 Gupta
5,614,808 A 3/1997 Konoya et al.
(Continued)

FOREIGN PATENT DOCUMENTS

JP H06-325830 A 11/1994
JP H07-193874 A 7/1995
(Continued)

*Primary Examiner* — Drew A Dunn
*Assistant Examiner* — Harry O'Neill-Becerril
(74) *Attorney, Agent, or Firm* — Harness, Dickey & Pierce, P.L.C.

(57) ABSTRACT

An electric vehicle is able to be charged from a power source via a supply side controller. The supply side controller retrieves and acquires vehicular information from the electric vehicle as an electric connection is established with the electric vehicle. The supply side controller stores the retrieved vehicular information. The vehicular information may contain charging information used for a charging control and non-charging information not used for the charging control. An information device, such as a smart phone, requests to supply the vehicular information. In response to the request, the supply side controller supplies the stored vehicular information to the information device without accessing the battery charger and the vehicular functional device. Accordingly, it is possible to supply the vehicular information without rebooting the controller on the vehicle in response to the request from the information device.

20 Claims, 4 Drawing Sheets

(51) Int. Cl.
*B60L 3/00* (2019.01)
*B60L 3/12* (2006.01)
*B60L 3/04* (2006.01)
*B60L 11/14* (2006.01)
*B60L 15/20* (2006.01)

(52) U.S. Cl.
CPC ....... *B60L 2260/52* (2013.01); *B60L 2260/54* (2013.01); *B60L 2260/56* (2013.01); *B60L 2260/58* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/72* (2013.01); *Y02T 10/7283* (2013.01); *Y02T 10/7291* (2013.01); *Y02T 10/92* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 8,717,170 B1* | 5/2014 | Juhasz | B60L 11/1838 320/109 |
| 9,753,970 B2* | 9/2017 | Petrie | G06F 17/30386 |
| 2009/0033288 A1 | 2/2009 | Takano et al. | |
| 2009/0184833 A1 | 7/2009 | Tonegawa et al. | |
| 2010/0039069 A1 | 2/2010 | Niwa et al. | |
| 2010/0161482 A1* | 6/2010 | Littrell | B60L 3/12 705/40 |
| 2010/0174667 A1 | 7/2010 | Vitale et al. | |
| 2012/0221703 A1 | 8/2012 | Schwager et al. | |
| 2013/0132635 A1 | 5/2013 | Cui et al. | |
| 2013/0179021 A1 | 7/2013 | Nonaka et al. | |
| 2013/0289821 A1* | 10/2013 | Nakagawa | B60L 11/1861 701/31.4 |
| 2013/0334879 A1* | 12/2013 | Ido | B60R 16/033 307/10.1 |
| 2014/0015494 A1 | 1/2014 | Kobayashi et al. | |

FOREIGN PATENT DOCUMENTS

| | | |
|---|---|---|
| JP | 2000-307596 A | 11/2000 |
| JP | 2007-230520 | 9/2007 |
| JP | 2008-067425 A | 3/2008 |
| JP | 2009-033804 A | 2/2009 |
| JP | 2011-254642 A | 12/2011 |
| JP | 2012-147580 A | 8/2012 |
| JP | 2012-210007 | 10/2012 |
| JP | 2012-228055 | 11/2012 |
| JP | 2014-011849 A | 1/2014 |
| WO | 2010/081141 A2 | 7/2010 |
| WO | 2011/026568 A1 | 3/2011 |
| WO | 2012/042900 A1 | 4/2012 |

* cited by examiner

CHARGE CONTROLLER FOR VEHICLE

CROSS REFERENCE TO RELATED APPLICATION

This application is based on Japanese Patent Application No. 2013-158321 filed on Jul. 30, 2013, the disclosure of which is incorporated herein by reference.

TECHNICAL FIELD

The present disclosure relates to a charge controller which supplies and charges electric power to a battery on a vehicle.

BACKGROUND

Patent Literatures 1-3 (PLT1-3) disclose charge controllers which supplies and charges electric power to a battery on a vehicle. Disclosed technologies provide data communication between the vehicle and an information system via an electric connection which relates to the charging. For example, the technologies disclosed in Patent Literatures 2 and 3 may supply information relating to devices on the vehicle to an external information system.

Patent Literatures

PLT1: JP2007-230520A
PLT2: JP2012-228005A
PLT3: JP2012-210007A

SUMMARY

The external information system may requests to supply information in the vehicle. For example, diagnostic information obtained by a diagnostic apparatus on the vehicle may be requested to supply. For example, drive information such as a map or a scheduled trip path of a vehicle navigation device may be requested. For example, protected information, such as music information memorized in a vehicle audio device, which can be used only by an authorized user, may be requested.

Such a request from the external information system may be generated regardless of stages of progress or conditions of a charge operation. For example, the request from the external information system may be brought about in a standby condition before the charge operation to the vehicle is started, or a standby condition after the charge operation is finished. In this case, a device on the vehicle is required to transit from a low-power-consumption condition to a condition where the device can perform communication in order to meet the request from the external information system. Such a transition may be called a wake-up from a sleep condition or a reboot action. In the following description, the transition is called as the reboot action.

However, the frequent reboot action of controllers on the vehicle is not desirable from a viewpoint of power consumption, or a viewpoint of durability. In view of the above-mentioned viewpoint or viewpoints which are not mentioned, it is required to improve a charge controller for vehicle, which is capable of supplying vehicular information to the external information system.

It is an object of the disclosure to provide an improved charge controller for vehicle which can reduce the number of reboots of controllers on the vehicle.

It is another object of the disclosure to provide an improved charge controller for vehicle which can supply information about controllers on the vehicle to the external information system while reducing the number of reboots of controllers on the vehicle.

The present disclosure employs the following technical means, in order to attain the above-mentioned object.

According to the disclosure, a charge controller for a vehicle is provided. The charge controller is disposed between an electric vehicle and a power source and performs charging operation from the power source to the electric vehicle. The charge controller comprises a charge control section which controls the charging operation from the power source to the electric vehicle. The charge controller comprises a storage device which is capable of storing vehicular information including charging information having relation to the charging operation and a non-charging information having no relation to the charging operation. The charge controller also comprises a data management section which controls the storage device. The data management section includes a retrieving section which retrieves the vehicular information from the electric vehicle. The data management section includes a storing section which stores the vehicular information retrieved by the retrieving section in the storage device. The data management section includes a supplying section which selects a part from the vehicular information stored in the storage device, and supplies the selected part to an external information system.

According to this disclosure, the vehicular information retrieved from the electric vehicle is stored in the storage device. The supply section selects a part of the vehicular information stored in the storage device and supplies the selected part to the external information system. Accordingly, the charge controller can supply the vehicular information to the external information system without accessing the electric vehicle, i.e., without rebooting a controller on the vehicle from a low-power-consumption condition. Thereby, it is possible to reduce reboot of the controller on the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are explained referring to drawings. In the embodiments, the same parts and components as those in each embodiment are indicated with the same reference numbers and the same descriptions will not be reiterated. In a case that only a part of component or part is described, other descriptions for the remaining part of component or part in the other description may be incorporated. Components and parts corresponding to the components and parts described in the preceding description may be indicated by the same reference number and may not be described redundantly.

First Embodiment

Figure 1:
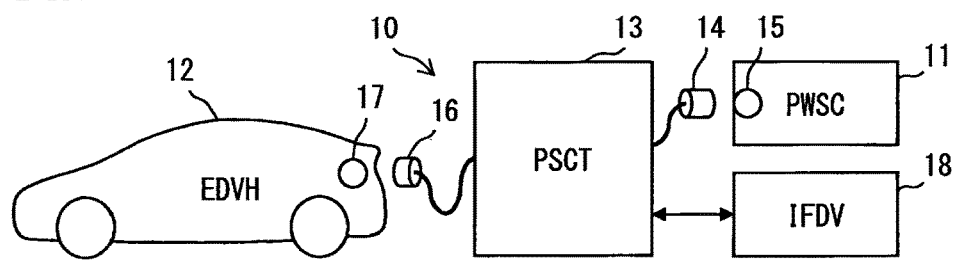
FIG. 1 is a block diagram showing a charge system for vehicle according to a first embodiment.

Referring to FIG. 1, a vehicle charging system 10 has a power source (PWSC) 11 and an electric vehicle (EDVH) 12. The power source 11 is a power source which is available in a private house or a business place. The power source 11 can be provided by a regional power network or a private power plant. The electric vehicle 12 is a vehicle which has a battery capable of being charged from an external power source. The electric vehicle 12 is a vehicle which uses energy of the power source for at least a part of driving energy, i.e., moving energy. The electric vehicle 12 may be, for example, a pure electric powered vehicle, which uses only an electric motor as a driving power source, or a plug-in hybrid vehicle, which uses an electric motor and an internal combustion engine as a driving power source.

The vehicle charging system 10 has a supply side controller (PSCT) 13 which supplies electric power to the electric vehicle 12 from the power source 11. The supply side controller 13 has a plug 14 and a connector 16. The plug 14 is disposed on an end of a cable extended from a main body of the supply side controller 13. The plug 14 is a connecting device connectable with an output 15 of the power source 11. The connector 16 is disposed on an end of the cable extended from the main body of the supply side controller 13. The connector 16 is a connecting device connectable with an inlet 17 of the electric vehicle 12.

The supply side controller 13 is disposed between the power source 11 and the electric car 12. The supply side controller 13 makes possible an electric power supply from the power source 11 to the electric vehicle 12 at least. The supply side controller 13 provides a charge controller for a vehicle, which performs charging operation from the power source 11 to the electric vehicle 12. The supply side controller 13 can be configured as a portable device. The supply side controller 13 may provide a reverse power flow from the electric vehicle 12 to the power source 11.

The supply side controller 13 can turn on and turn off an electric power supply from the power source 11 to the electric vehicle 12. The supply side controller 13 may also be referred to as a shutdown circuit or a CCID (Charging Circuit Interrupter Device) box, which can interrupt the electric power supply from the power source 11 to the electric vehicle 12. The supply side controller 13 may also be referred to as an earth-leakage breaker which interrupts the electric power supply from the power source 11 to the electric vehicle 12 in response to an earth-leakage.

The vehicle charging system 10 has an information device (IFDV) 18. The information device 18 is an external device which can function independently from the electric vehicle 12. The information device 18 may be referred to as an external information system 18 which can be disposed on an outside of the electric vehicle 12. The information device 18 provides an interface between the user of the vehicle charging system 10 and the vehicle charging system 10, and/or an interface between the user of the electric vehicle 12 and devices on the electric vehicle 12. The information device 18 can be provided by a microcomputer, a portable telephone, a smart phone, etc.

The information device 18 can perform data communication with the supply side controller 13. The data communication between the supply side controller 13 and the information device 18 may be provided by a cable or wireless. The information device 18 can be provided by a device which can independently perform the data communication with the supply side controller 13. For example, the data communication between the supply side controller 13 and the information device 18 can be provided by using the short-distance wireless-communication technique. Alternatively, the information device 18 may be provided by a device which can perform data communication with the supply side controller 13 via a communication line. For example, the data communication between the supply side controller 13 and the information device 18 can be provided by using a cable or wireless communication line of Local Area Network or telecommunication lines.

Figure 2:
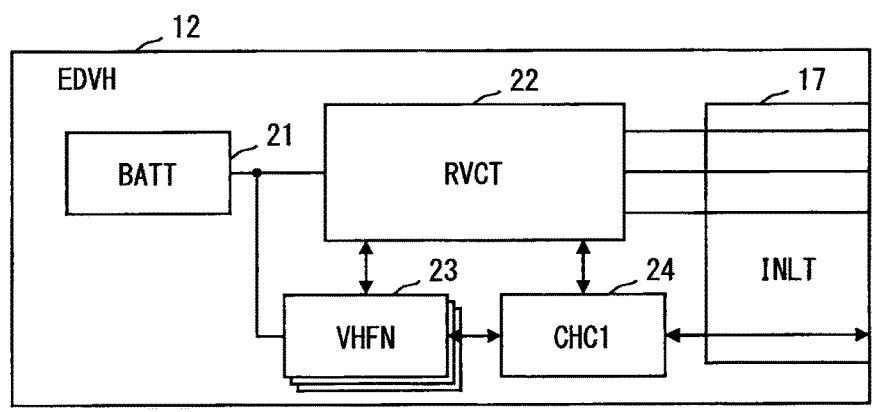
FIG. 2 is a block diagram showing a device mounted on an electric vehicle according to the first embodiment.

Referring to FIG. 2, the electric vehicle 12 has a battery (BATT) 21 which can be charged by the electric power supplied to an inlet (INLT) 17. The battery 21 is a high-voltage and large-capacity rechargeable battery which can be used as a power source for driving, i.e., moving the electric vehicle 12.

The electric vehicle 12 has a battery charger (RVCT) 22. The battery charger 22 is disposed between the inlet 17 and the battery 21. The battery charger 22 can include a power inverter circuit. The battery charger 22 supplies charging electric power to the battery 21 by converting and/or adjusting the electric power supplied to the inlet 17 by the power inverter circuit.

The battery charger 22 has a receive side controller. The battery charger 22 regulates and maintains electric energy charged in the battery 21 within proper range. The battery charger 22 is also a charging control device. The supply side controller 13 and the battery charger 22, i.e., the receive side controller, are disposed between the power source 11 and the battery 21. In this embodiment, the supply side controller 13 provides the charge controller for a vehicle. The battery charger 22 is configured to perform data communication between the supply side controller 13 and the information device 18.

The electric vehicle 12 has a plurality of vehicular functional devices (VHFN) 23. Many of the vehicular functional devices 23 function with the electric power supplied from the battery 21. Each of the vehicular functional devices 23 has a controller provided by a microcomputer. The vehicular functional device 23 is configured to perform data communication with the information device 18.

The controller of the vehicular functional device 23 has a function which can transit operating condition of itself from a normal condition to a low-power-consumption condition when the function is not demanded. Such a function is called as a sleep function, for example. The controller also has a function which can transit operating condition of itself from the low-power-consumption condition to the normal condition when the function is demanded. Such a function is called as a wake-up function, for example. The controller is configured to transit to the low-power-consumption condition automatically after the electric vehicle 12 stops and after the charging operation to the battery 21 is completed. The controller is configured to maintain the low-power-consumption condition until reboot events, such as starting of the electric vehicle 12 or an access from the outside, occur.

An example of the vehicular functional device 23 is an electric powered air-conditioner mounted on the electric vehicle 12. The air-conditioner may have a pre-air-conditioning function which performs air-conditioning in a passenger compartment before the user actually enters the electric vehicle 12. In this case, the air-conditioner may transit from the low-power-consumption condition to the normal operating condition for performing the preparative air-conditioning function. The air-conditioner outputs setting conditions to the information device 18 in response to a request from the information device 18. The air-conditioner may change the setting conditions in response to the request from the information device 18. In order to collaborate with the information device 18, the air-conditioner may transit from the low-power-consumption condition to the normal operating condition.

An example of the vehicular functional device 23 is a self-diagnosis device mounted on the electric vehicle 12. The self-diagnosis device outputs data of diagnosis information stored therein to the information device 18 in response to a request from the information device 18. The self-diagnosis device may change setting conditions, such as a diagnosis schedule and diagnosis results, in response to the request from the information device 18. In order to collaborate with the information device 18, the self-diagnosis device may transit from the low-power-consumption condition to the normal operating condition.

An example of the vehicular functional device 23 is a vehicle navigation device mounted on the electric vehicle 12. The vehicle navigation device outputs driving information or traveling information, such as a traveled path in the past driving stored therein and a planned travel path in the future, in response to a request from the information device 18. The vehicle navigation device may change the setting conditions, such as a planned travel path in the future, in response to the request from the information device 18. In order to collaborate with the information device 18, the vehicle navigation device may transit from the low-power-consumption condition to the normal operating condition.

An example of the vehicular functional device 23 is an audio device mounted on the electric vehicle 12. The audio device outputs information, such as music data stored therein to the information device 18 in response to a request from the information device 18. The audio device may change the setting conditions or perform adding or updating music data in response to the request from the information device 18. In order to collaborate with the information device 18, the audio device may transit from the low-power-consumption condition to the normal operating condition.

The electric vehicle 12 has a charge communication device (CHC1) 24 for providing data communication between the battery charger 22 and the supply side controller 13. The charge communication device 24 performs data communication for the information relevant to the charging operation. The charge communication device 24 makes it possible to communicate the charging information between the battery charger 22 and the supply side controller 13. The charge communication device 24 makes it possible to communicate the non-charging information for the vehicular functional device 23 between the vehicular functional device 23 and the supply side controller 13. The charge communication device 24 is a part of devices which enable data communication between the vehicular functional device 23 and the information device 18.

The charge communication device 24 uses a data communication path established for the charging operation. The charge communication device 24 uses the data communication path which passes through the connector 16 and the inlet 17. The charge communication device 24 uses the data communication path of a cable or wireless. For example, the charge communication device 24 provides data communication via the power line connected between the connector 16 and the inlet 17. In another example, the charge communication device 24 may provide data communication via an electric wire connected through the connector 16 and the inlet 17 and prepared only for data communication.

Information, i.e., data, exchanged by data communication between the battery charger 22 and the supply side controller 13, and between the battery charger 22 and the information device 18 is vehicular information relevant to the electric vehicle 12. Vehicular information includes charging information which is used in the charging control to the battery 21. For example, identifying information unique for the electric vehicle 12 is also a kind of the charging information. Charge condition SOC, which shows an amount of charge in the battery 21, is a kind of the charging information. Information relevant to a charging schedule, such as a charge start time and/or a charge finish time, which may be set in the battery charger 22, is a kind of the charging information.

The information transmitted by data communication between the vehicular functional device 23 and the supply side controller 13 and between the vehicular functional device 23 and the information device 18 is the vehicular information relevant to the electric vehicle 12. This vehicular information may contain the charging information which is used in the charging control to the battery 21. This vehicular information may contain non-charging information irrelevant to the charging control to the battery 21. Non-charging information is also the information which is not used in the charging control to the battery 21. For example, a preset temperature for air conditioning, a planned traveling path used for vehicle navigation, music data stored in the audio device, etc. may be classified into non-charging information.

Figure 3:
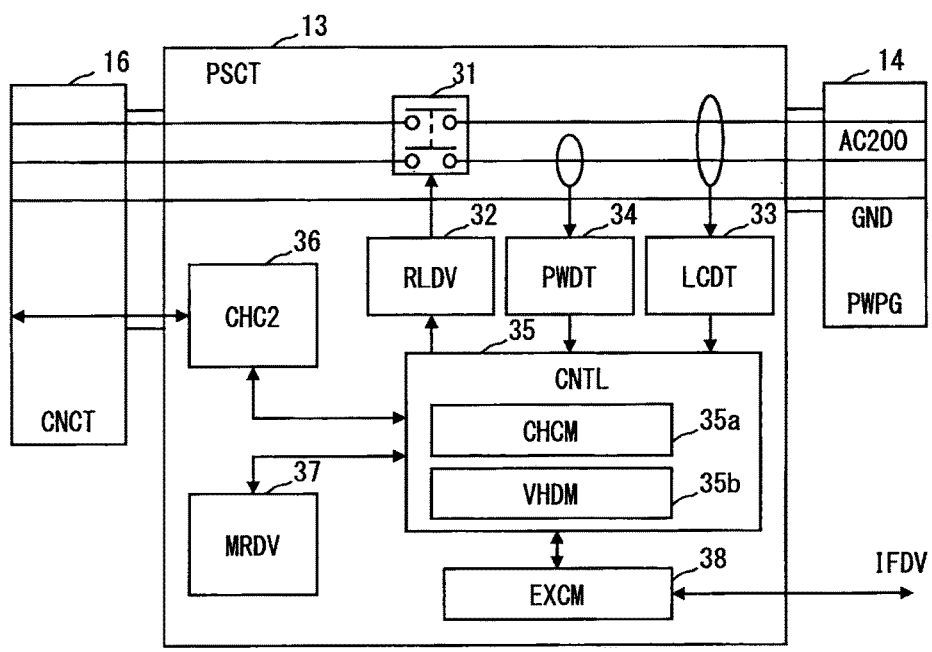
FIG. 3 is a block diagram showing a supply-side-controller according to the first embodiment.

Referring to FIG. 3, the supply side controller 13 has a power line which electrically connects between a plug (PWPG) 14 and a connector (CNCT) 16. An alternating-current power line having the three-wire system is illustrated.

The supply side controller 13 has a relay 31 which can be used as a circuit breaker on the power line. The relay 31 is capable of shutting down electric power supply from the power source 11 to the electric vehicle 12. The supply side controller 13 has a shutdown driver circuit (RLDV) 32 which drives the relay 31. The supply side controller 13 has an earth-leakage detector circuit (LCDT) 33 which detects an earth-leakage based on current flowing through the power line. The supply side controller 13 has the electric-power detector circuit (PWDT) 34 which detects the electric power charged to the battery 21 based on current flowing through the power line.

The supply side controller 13 has a controller (CNTL) 35. The controller 35 has a charge control section (CHCM) 35*a* which performs charging control for controlling charging operation from the power source to the electric vehicle. The charge control section 35*a* controls the relay 31 and controls charging operation to the battery 21 while collaborating with the battery charger 22. The controller 35 has a data management section (VHDM) 35*b* which controls the storage device. The data management section 35*b* manages the vehicular information exchanged by data communication between the vehicular functional device 23 and the information device 18. The data management section 35*b* manages at least non-charging information. The non-charging information is provided from the vehicular functional device 23 to the information device 18. The data management section 35*b* may additionally manage charging information.

The supply side controller 13 has a charge communication device (CHC2) 36 for providing data communication between the supply side controller 13 and the battery charger 22. The charge communication device 36 performs data communication for the information relevant to the charging operation. The charge communication device 36 makes it possible to communicate the charging information between the battery charger 22 and the supply side controller 13. The charge communication device 36 makes it possible to communicate the non-charging information for the vehicular functional device 23 between the vehicular functional device 23 and the supply side controller 13. The charge communication device 36 is also a part of devices which enable data communication between the vehicular functional device 23 and the information device 18.

The charge communication device 36 uses a data communication path established for the charging operation. The charge communication device 36 uses the data communication path which passes through the connector 16 and the inlet 17. The charge communication device 36 uses the data communication path of a cable or wireless. For example, the charge communication device 36 provides data communication via the power line connected between the connector 16 and the inlet 17. In another example, the charge communication device 36 may provide data communication via an electric wire connected through the connector 16 and the inlet 17 and prepared only for data communication.

The charge communication device 24 and the charge communication device 36 can be provided by communication devices using a power line, communication devices using a dedicated line, or communication devices using wireless RF coupling.

The supply side controller 13 has a storage device (MRDV) 37. The storage device 37 is provided by a semiconductor memory device. The storage device 37 temporally stores the vehicular information acquired from the electric vehicle 12. The storage device 37 stores and memorizes the vehicular information acquired from the battery charger 22 and the vehicular functional device 23. The storage device 37 stores and memorizes the non-charging information acquired from the vehicular functional device 23 at least. The storage device 37 keeps the vehicular information stored over a long period of time sufficiently long enough with respect to a processing cycle of the controller 35. The storage device 37 continuously keeps the vehicular information stored over a period in which the vehicular functional device 23 is in the low-power-consumption condition after the vehicular functional device 23 transmits the vehicular information. The storage device 37 is capable of storing vehicular information including charging information relevant to the charging operation and non-charging information irrelevant to the charging operation. The storage device 37 keeps the vehicular information acquired from the electric vehicle 12 between the electric vehicle 12 and the information device 18.

The supply side controller 13 has an external communication device (EXCM) 38. The external communication device 38 provides data communication between the supply side controller 13 and the information device 18. The external communication device 38 performs data communication to the information device 18 via a general-purpose network which may be used for a mobile phone. The controller 35 and the external communication device 38 provide a gateway between the internal data protocol designed for an internal use focusing on the electric vehicle 12 and an external data protocol including the general-purpose network.

The storage device 37 is controlled by the data management section 35b. The data management section 35b makes the storage device 37 stores and memorizes the non-charging information acquired from the controller on the vehicle containing the battery charger 22 and the vehicular functional device 23. The data management section 35b supplies the non-charging information stored in the storage device 37 in response to a request from the information device 18. The data management section 35b supplies the non-charging information to the information device 18 without accessing to the vehicular functional device 23, in other words during a period in which the vehicular functional device 23 is in the low-power-consumption condition. The data management section 35 reduces access to the vehicular functional device 23, i.e., rebooting of the vehicular functional device 23. The data management section 35b and the storage device 37 provide a data relay module disposed between the vehicular functional device 23 and the information device 18. This data relay module is placed on a side to the information device 18 rather than a connecting portion for the charging operation provided by the connector 16 and the inlet 17.

The data management section 35b provides the vehicular information retrieving section which acquires the vehicular information from the battery charger 22 and the vehicular functional device 23 as a connection for charging is established, and stores the vehicular information in the storage device 37. The vehicular information, which the data management section 35b acquires, may include both charging information and non-charging information. The data management section 35b provides an information holding section for holding at least the non-charging information continuously for a period after acquiring the vehicular information until a predetermined cancelling condition for cancelling the holding is satisfied, without asking renewal of the vehicular information for the vehicular functional device 23. In other words, in this period, the data management section 35b inhibits access to the battery charger 22 and the vehicular functional device 23. During this period, the data management section 35b provides and works as a supplying section which supplies the non-charging information stored in the storage device 37 to the information device 18 in response to a request from the information device 18. During this period, the charging information may be updated based on the charging information acquired from the battery charger 22.

The data management section 35b provides an information holding section for holding at least the non-charging information continuously for a period after acquiring the vehicular information until a predetermined cancelling condition for cancelling the holding is satisfied, and also for a period after the charging operation is finished, without asking renewal of the vehicular information for the vehicular functional device 23. During this access inhibiting period, the data management section 35b provides and works as a supplying section which supplies the non-charging information stored in the storage device 37 to the information device 18 in response to a request from the information device 18. During the access inhibiting period, the charging information is not updated too. As the cancelling condition is satisfied, the data management section 35b permits access to the vehicular functional device 23.

The period in which the data management section 35b uses the vehicular information stored in the storage device 37 without performing access to the battery charger 22 and the vehicular functional device 23 is continued throughout a non-using period of the electric vehicle 12. That is, if an event equivalent to a use of the electric vehicle 12 is detected, the access inhibiting is cancelled. The event an event equivalent to a use of the electric vehicle 12 may be used as one of the above-mentioned cancelling condition. For example, an operation for using function provided on the electric vehicle 12, an external signal, or an internal signal may be used as one of the cancelling condition.

For example, re-connecting operation of the connector 16 and the inlet 17 may be used as one of the cancelling condition. Re-connecting operation of the connector 16 and the inlet 17 may be considered as a re-establishment of connection for the charging operation, i.e., the first operation which may be a part of the charging operation. Alternatively or additionally, starting of the pre-air-conditioning of the air-conditioner may be considered as one of the cancelling condition. Unlike use of the non-charging information, starting of the pre-air-conditioning corresponds to a request for activating the vehicular functional device 23. In other words, starting of the pre-air-conditioning may be considered as a use of the electric vehicle 12, i.e., starting of driving use of the electric vehicle 12. Alternatively or additionally, an operation for rewriting the information stored in the vehicular functional device 23 from the information device 18 may be used as one of the cancelling condition. Unlike mere use of the non-charging information, such rewriting operation corresponds to a request for activating the vehicular functional device 23, i.e., a use of the electric vehicle 12.

The above-mentioned controllers are electronic control units. The controller has at least one processing unit (CPU) and at least one memory (MMR) as a storage medium which stores and memorizes a program and data. The controller is provided by a microcomputer which has a storage medium which can be read by computer. The storage medium is a non-transitory storage medium which stores a program readable by the computer. The storage medium may be provided with semiconductor memory or a magnetic disc. The controller may be provided with a computer or a set of computer resources linked by a data communication device. The program, when the controller executes the program, makes the controller to function as the apparatus described in this specification, and makes the controller to function to perform methods, such as control method, described in this specification. The controller provides various components. At least a part of the components may be referred to as means for performing function, and from the other viewpoint, at least a part of the components may be referred to as compositional block or module.

Figure 4:
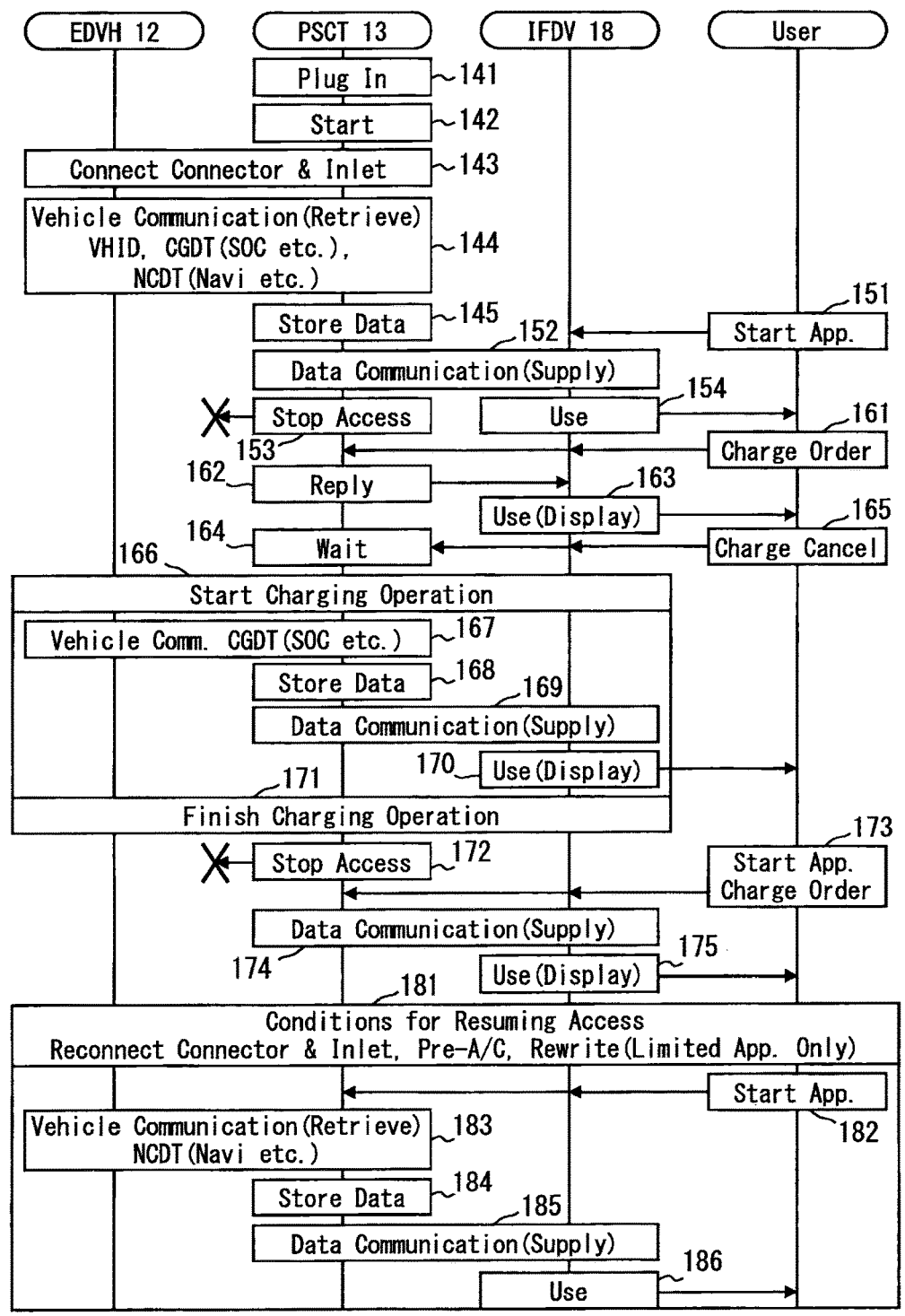
FIG. 4 is a sequence diagram showing processing flow according to the first embodiment.

FIG. 4 is a sequence diagram showing an example of processing flow according to the first embodiment. In the drawing, steps of processing and operations on the electric vehicle (receiving side controller) 12, the supply side controller 13, the information device 18, and a user are illustrated. The operation on the user corresponds to operations on the information device 18 by the user.

Preparing Charging Operation

In step 141, the plug 14 is connected to the output unit 15. In step 142, the supply side controller 13 is activated and started. In step 143, the connector 16 and the inlet 17 are connected. Thereby, a connection for charging is built and established. In response to the establishment of connection, the battery charger 22 starts preparing operation for the charging operation. For example, the battery charger 22 starts data communication for the charging operation between the supply side controller 13 and the battery charger 22.

In step 144, the battery charger 22 and the vehicular functional device 23 transmit the vehicular information to the supply side controller 13. Step 144 is also processing in which the supply side controller 13 acquires the vehicular information. The vehicular information includes identification information VHID for identifying the electric vehicle 12, the charging information CGDT, and the non-charging information NCDT. The charging information CGDT may include a charge condition SOC of the battery 21 for example. The non-charging information NCDT may include information Navi of the planed traveling path registered in the vehicle navigation device. Step 144 provides the retrieving section which retrieves vehicular information from the electric vehicle 12. The data management section 35*b* has the retrieving section. The retrieving section retrieves the vehicular information from the electric vehicle 12 in response to an establishment of an electric connection to the electric vehicle 12. The retrieving section acquires and retrieves the vehicular information via the established electric connection.

In step 145, the vehicular information retrieved by the supply side controller 13 is stored in the storage device 37. Step 145 provides a storing section which stores the vehicular information retrieved by the retrieving section in the storage device 37. The data management section 35*b* has the storing section.

In step 144, various kinds of the vehicular information relating to a plurality of controllers 22 and 23 disposed on the electric vehicle 12 are retrieved. In step 144, all information, which can be retrieved from the electric vehicle 12, may be retrieved. In step 145, all information retrieved is stored in the storage device 37. An amount of retrieved and stored information is more than the information requested from the information device 18 in later steps and the information actually used by the information device 18 in later steps. In other words, the amount of information retrieved in step 144 and stored in the storage device 37 in step 145 includes and more than the information that will be actually used in one event of use at the information device 18. In a case that a request for supplying the vehicular information occurs after steps 144 and 145, the supply side controller 13 can supply the vehicular information to the information device 18 by using the vehicular information stored in the storage device 37, without accessing the battery charger 22 and the vehicular functional device 23. According to this configuration, various kinds of vehicular information which can meet various requests may be retrieved before the actual request, without waiting for the actual request from the external information system.

Use of the Vehicular Information Before Charge

The information device 18 is operated by the user in step 151. Here, application software registered in the information device 18 is activated and started. An example of the application software is software using the non-charging information. For example, the user may activates the application software which makes the information device 18 display the information of the planed traveling path at the outside of the electric vehicle 12. The application software started here may be software which uses the charging information.

In response to activating the application software, in step 152, the information device 18 and the supply side controller 13 begin to perform data communication. In this stage, the supply side controller 13 supplies the vehicular information stored in the storage device 37 to the information device 18. Step 152 corresponds to the supply section which selects a part of the vehicular information memorized and stored in the storage device 37 and supply the selected part to the external information system 18. Step 152 provides the supplying section 152 before the charging operation. The supplying section 152, in a case of before the charge control section 35*a* performs the charging operation and after the storing section stored the vehicular information in the storage device 37, selects a part from the vehicular information stored in the storage device 37 and supplies the selected part to the external information system 18 without access to the electric vehicle 12. The data management section 35*b* has the supplying section before the charging operation.

In step 153, the supply side controller 13 inhibits access to the electric vehicle 12. In this stage, the latest data of the vehicular information containing the non-charging information acquired from the vehicular functional device 23 is stored in the storage device 37. Therefore, it is not necessary to re-acquire the latest vehicular information from the vehicular functional device 23. Therefore, it is possible to reduce reboots of the vehicular functional device 23 by the access-inhibiting operation performed by step 153. Step 153 provides an inhibiting section 153 which inhibits access to the electric vehicle 12. The inhibiting section 153 inhibits access when the electric vehicle 12 is not used before the charge control section 35*a* performs the charging operation and after the storing section stored the vehicular information in the storage device 37. The data management section 35*b* has the inhibiting section for a period before the charging operation.

On the other hand, the vehicular information is used by the information device 18 in step 154. As a result, the information device 18 provides service for the user based on the vehicular information relayed by the storage device 37.

For example, the information device 18 determines that whether it is permitted to perform an operation from the information device 18 based on the identification information VHID for the electric vehicle 12 which is retrieved by the supply side controller 13 from the battery charger 22 and is supplied by the supply side controller 13 to the information device 18. Specifically, the information device 18 evaluates justification for charging the electric vehicle 12 based on the identification information VHID for the electric vehicle 12 and the registered information registered in the information device 18. If a charging operation to the electric vehicle 12 is not permitted, the information device 18 displays message for showing the charging operation is impossible. If a charging operation to the electric vehicle 12 is permitted, the information device 18 displays message for showing the charging operation is possible. The user may judge whether consecutive operations for the charging operation shall be performed or not based on the displayed message on the information device 18.

Processing in steps 151-154 provide processing which uses the vehicular information for a non-charging application. This kind of non-charging application processing may be repeated for a standby period until the charging operation is started, in response to a request from the user or a request from the information device 18. As a result, the vehicular functional device 23 can continue to keep the low-power-consumption condition during this period.

Charging Operation

In step 161, the information device 18 is operated by the user. Here, the user instructs starting the charging operation. This instruction is supplied to the supply side controller 13 via the information device 18. In step 162, the supply side controller 13 replies to the information device 18 about the supply side controller 13 has actually received the instruction for starting the charging operation. In step 163, the information device 18 displays to the user that the instruction for starting the charging operation is successfully transmitted.

In step 164, the supply side controller 13 stands by during a predetermined time. This standby operation is continued after the reply until an actual charging operation is started. The period of the standby operation is disposed in order to provide an opportunity to cancel the instruction for starting the charging operation to the user. The period of the standby operation can be set, for example as 30 seconds. The standby operation is useful in a case that an operation to generate the instruction in step 161 is an error for example. The period of the standby operation is set based on a time period which is considered necessary to allow the user recognizes the display in step 163, notices the mistake, recognizes the necessity for cancellation, and also performs a cancelling operation on the information device 18. Step 164 provides a standby section 164 which starts the charging operation to the electric vehicle 12 after a predetermined time period has elapsed after a charge-start-instruction of a user on the information system 18. The user performs the charge-start-instruction to start the charging operation. The charge control section 35*a* includes a standby section 164. The predetermined time period is longer than a time period which the user needs to cancel the charge-start-instruction after the user issued the charge-start-instruction on the information system.

During the standby operation, cancellation of the charging operation may be instructed as shown in step 165. In this case, the charge-start-instruction in step 161 is canceled and processing is resumed to the standby condition after step 145.

As the predetermined time period for the standby operation has elapsed, processing advances to step 166. In step 166, an actual charging operation is started. In step 166, the charge-start-instruction is transmitted to the electric vehicle 12 from the supply side controller 13. In response to the transmittal, the battery charger 22 of the electric vehicle 12 transmits an reply, which shows start of the charging operation, to the supply side controller 13. As a result, the supply side controller 13 starts electric power supply to the electric vehicle 12. Simultaneously, the battery charger 22 starts the charging operation to the battery 21. Step 166 provides a cancelling section 166 which cancels the access inhibition before the charging operation in response to a use of at least one function of the electric vehicle 12. The data management section 35*b* has the cancelling section for a period before the charging operation.

In step 167, data communication of the vehicular information during the charging operation is performed. During the period of the charging operation, many of the vehicular functional devices 23 are set in the low-power-consumption condition. Accordingly, in step 167, the charging information CGDT is transmitted to the supply side controller 13 from the battery charger 22 at least. In step 168, the supply side controller 13 stores the acquired vehicular information to the storage device 37.

In step 169, supplying the vehicular information from the supply side controller 13 to the information device 18 is performed. First, a request from supplying information may be transmitted from the information device 18. The request may contain information for specifying necessary information to be transmitted. The supply side controller 13 supplies the vehicular information stored in the storage device 37 to the information device 18 in response to the request from the information device 18.

In step 170, the vehicular information is used. Here, for example, the information device 18 displays the latest charged condition based on the latest charging information. For example, the information device 18 displays an amount of electric energy charged in the battery 21. In addition, the information device 18 may additionally or alternatively display expected end time of the charging operation and/or fee for the charging operation, etc.

The operation for data communication in step 169, i.e., the operation for supplying the vehicular information, and the operation using the vehicular information in step 170 may be performed periodically. It is because operations in steps 169 and 170 are operations for the charging information performed during the charging operation.

Ending operation for the charging operation is performed in step 171. On the electric vehicle 12 side, the battery charger 22 determines that whether the battery 21 reached a target charge level. If the battery 21 reached the target charge level, the battery charger 22 transmits information which shows that the charging operation was completed to the supply side controller 13. Simultaneously, the battery charger 22 may notify the supply side controller 13 that data communication for the vehicular information in steps 144 and 167 are completed, and storing of the vehicular information to the supply side controller 13 in steps 145 and 168 are completed. The information notified here can be used as conditions for inhibiting access to the vehicular functional device 23 from the supply side controller 13.

Use of Vehicular Information After Charge

In step 172, it is inhibited to perform an access from the supply side controller 13 to the vehicular functional device 23. That is, the access corresponds to processing of retrieval or acquisition of the non-charging information stored in the vehicular functional device 23. This access inhibition is continued until a predetermined condition for cancelling the inhibition occurs. Step 172 provides an inhibiting section 172 which inhibits access to the electric vehicle 12. The inhibiting section 172 inhibits access when the electric vehicle 12 is not used after the charge control section 35a performed the charging operation and after the storing section stored the vehicular information in the storage device 37. The data management section 35b has the inhibiting section for a period after the charging operation.

In step 173, the user operates the information device 18 to input an order or an instruction for starting application software or for starting the charging operation. This operation corresponds to the above-mentioned step 151 or step 161.

In step 174, the information device 18 and the supply side controller 13 performs data communication in response to a user's above-mentioned instruction. In this stage, the supply side controller 13 supplies the vehicular information stored in the storage device 37 to the information device 18. Step 174 corresponds to the supply section which selects a part of the vehicular information memorized and stored in the storage device 37 and supply the selected part to the external information system 18. The data management section 35b has the supplying section. Step 174 provides the supplying section 174 after the charging operation. The supplying section 174, in a case of after the charge control section 35a performed the charging operation and after the storing section stored the vehicular information in the storage device 37, selects a part from the vehicular information stored in the storage device 37 and supplies the selected part to the external information system 18 without access to the electric vehicle 12. The supplying section selects a part of the vehicular information based on a request from the external information system 18. The supplying section selects a part of the vehicular information which corresponds to the request from the information system 18.

In step 175, the information device 18 provides service for the user by using the vehicular information. The operation from step 173 to step 175 corresponds to the operation from step 151 to step 154, or operation from step 161 to step 163.

A period after the charging operation is completed corresponds to condition where the electric vehicle 12 is just parked. In this period, the supply side controller 13 supplies the vehicular information stored in the storage device 37 to the information device 18. Therefore, the supply side controller 13 can provide the vehicular information to meet the request from the information device 18, without rebooting the battery charger 22 and the vehicular functional device 23. In this period, it is possible to reduce reboot of the vehicular functional device 23 resulting from the request from the supply side controller 13. In this embodiment, the vehicular functional device 23 may be periodically rebooted from the low-power-consumption condition.

Cancellation of Access Inhibition (Reboot)

Event, which may satisfy the cancelling condition for cancelling the access inhibition, occurs in step 181. One of the cancelling condition is re-connecting of the connector 16 and the inlet 17. One of the cancelling condition is starting of the pre-air-conditioning by the air-conditioner. One of the cancelling condition is rewriting operation of the information stored in the vehicular functional device 23 from the information device 18. Such rewriting operation may be possible via limited application software which can be run on the information device 18. Step 181 provides a cancelling section 181 which cancels the access inhibition after the charging operation in response to a use of at least one function of the electric vehicle 12. The data management section 35b has the cancelling section for a period after the charging operation.

The drawing shows a case where the application software is activated from step 182 to step 186. In step 182, application software on the information device 18 is activated by the user. In step 183, data communication for the vehicular information between the electric vehicle 12 and the supply side controller 13 is performed in response to the operation in step 182. Here, the supply side controller 13 performs access to the controller on the electric vehicle 12 in order to request the vehicular information. Specifically, the supply side controller 13 requests the battery charger 22 or the vehicular functional device 23 to transmit the vehicular information. Thereby, the battery charger 22 or the vehicular functional device 23 transmits the vehicular information to the supply side controller 13. Thereby, the supply side controller 13 receives the vehicular information.

In step 184, the supply side controller 13 stores the acquired vehicular information to the storage device 37. In step 185, the supply side controller 13 supplies the vehicular information stored in the storage device 37 to the information device 18. In step 186, the information device 18 uses the vehicular information.

In the example from step 182 to step 186, since the charging operation is already completed, the non-charging information NCDT is acquired, for example. This non-charging information NCDT may contain a plurality of information acquirable from the electric vehicle 12. An amount of information contained in the non-charging information NCDT is more than the information requested from the information device 18 in step 182, and the information used by the information device 18 in step 186. In a case that the request for supplying the vehicular information is generated again after step 186, the supply side controller 13 may supply the vehicular information to the information device 18 by using the vehicular information stored in the storage device 37, without accessing the battery charger 22 and the vehicular functional device 23.

According to this embodiment, data of the vehicular information acquired and retrieved from the electric vehicle 12 is stored in the storage device 37. The supplying section selects a part from the vehicular information stored in the storage device 37, and supplies the selected part to the external information system 18. Accordingly, the charge controller for vehicle can supply data of the vehicular information to the external information system 18, without accessing the electric vehicle 12, i.e., without rebooting the controllers 22 and 23 on the vehicle from a low-power-consumption condition. Thereby, it is possible to reduce reboots of the controllers 22 and 23 on the vehicle.

Second Embodiment

This embodiment is one of modifications based on a basic form provided by the preceding embodiment. In the preceding embodiment, the supply side controller 13 has a single connector 16. Alternatively, it is possible to employ structure which can supply electric power to a plurality of electric vehicles 12.

Figure 5:
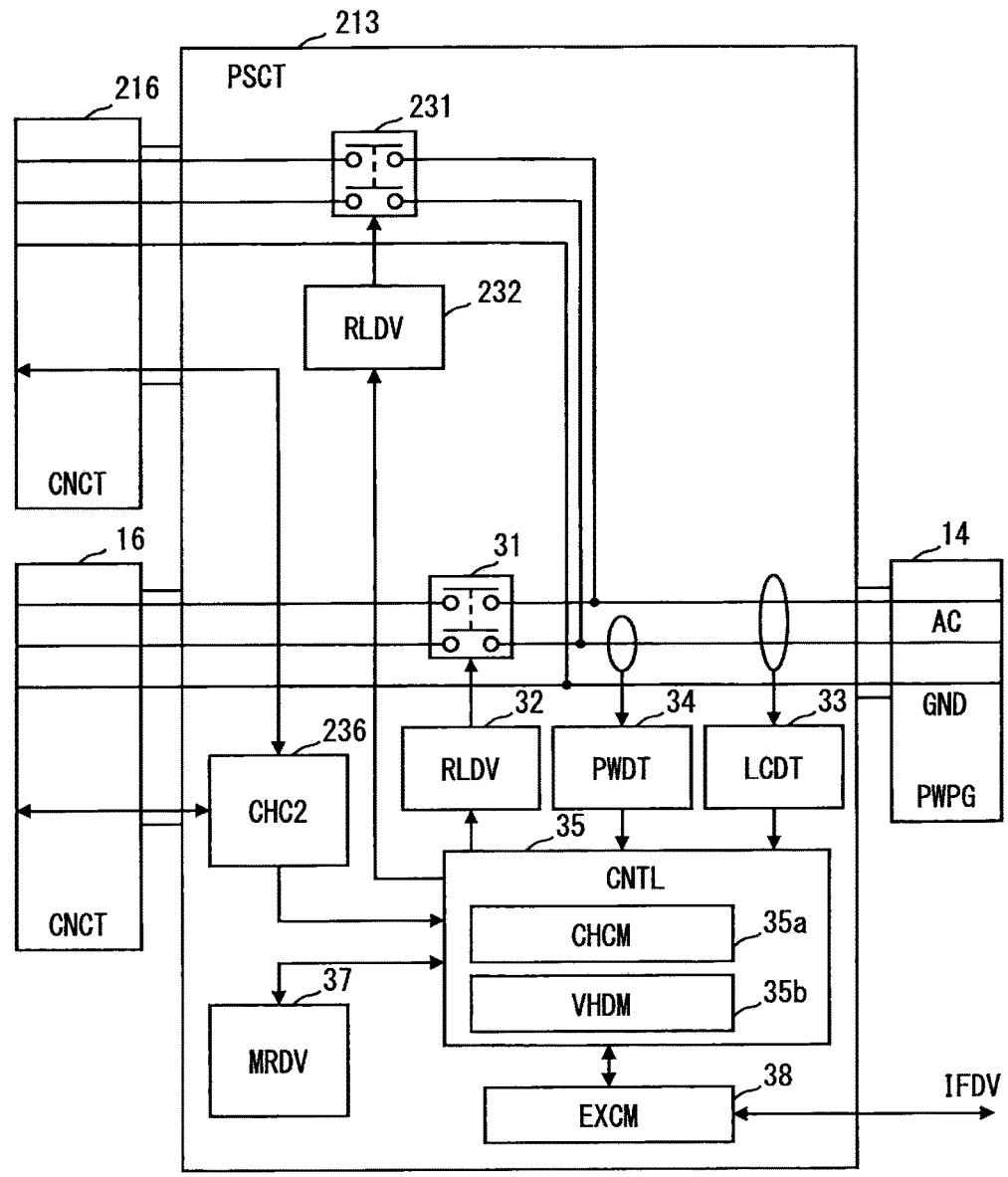
FIG. 5 is a block diagram showing a supply-side-controller according to a second embodiment.

As shown in FIG. 5, a supply side controller 213 has a first connector 16 and an additional second connector 216. Power lines are disposed in parallel to the first connector 16 and the second connector 216. The supply side controller 213 has a first relay 31 and an additional second relay 231. The supply side controller 213 has a first shut down circuit 32 and an additional second shut down circuit 232. The supply side controller 213 has a charge communication device 236 which is capable of performing data communication with the plurality of electric vehicles 12 via the plurality of connectors 16 and 216.

According to this configuration, it is possible to supply electric power to a plurality of electric vehicles 12. It is possible to supply non-charging information from the vehicular functional device 23 disposed in a plurality of electric vehicles 12 to the information device 18.

Other Embodiments

In the preceding embodiment, the supply side controller 13 provides the charge controller for a vehicle. Therefore, the storage device 37 which stores and accumulates the vehicular information is provided in the supply side controller 13. Alternatively, the storage device 37 may be provided in the battery charger 22 mounted on the electric vehicle 12. In this configuration, it is also possible to supply the vehicular information from the electric vehicle 12 to the information device 18 only by rebooting the battery charger 22, without rebooting other vehicular functional devices. That is, the charge controller for a vehicle may be provided by the supply side controller 13 and/or the battery charger 22, i.e., the receive side controller.

In the preceding embodiment, the electric vehicle 12 and the supply side controller 13 are electrically connected by a wire connection containing the cable and the connector 16. Alternatively, the electric vehicle 12 and the supply side controller 13 may be electrically connected by a high frequency inductive coupling.

The present disclosure is not limited to the above embodiments, and the present disclosure may be practiced in various modified embodiments. The present disclosure is not limited to the above combination, and disclosed technical means can be practiced independently or in various combinations. Each embodiment can have an additional part. The part of each embodiment may be omitted. The part may be replaced with the part in the other embodiment, or may be combined with the part of the other embodiment. The configurations of the above-mentioned embodiments, actions, and effectiveness are merely provided for illustration purpose. The scope of the present disclosure is not limited to the scopes described. Some extent of the disclosure may be shown by the scope of claim, and also includes the changes, which is equal to and within the same range of the scope of claim.

What is claimed is:

1. A charge controller for a vehicle, which is disposed between an electric vehicle and a power source, the charge controller comprising:
    a charge control section which controls, with at least one of processor, a charging operation from the power source to the electric vehicle;
    a storage device, located within the charge controller, which is capable of storing vehicular information including charging information relevant to the charging operation and a non-charging information irrelevant to the charging operation; and
    a data management section which controls, with the at least one of processor, the storage device, the data management section includes:
        a retrieving section which retrieves the vehicular information from the electric vehicle;
        a storing section which stores the vehicular information retrieved by the retrieving section in the storage device;
        a supplying section which selects a part from the vehicular information stored in the storage device, and supplies the selected part to an external information system; and
        an inhibiting section which inhibits access by the retrieving section in the data management section to retrieve the vehicular information from at least one vehicular functional device located on the electric vehicle, when the electric vehicle is unused after the charge control section performed the charging operation, and after the storing section has already stored the vehicular information retrieved by the retrieving section in the storage device,
    the supplying section, in a case of after the charge control section performed the charging operation and after the storing section stored the vehicular information in the storage device, selects a part from the vehicular information stored in the storage device and supplies the selected part to an external information system without access to the electric vehicle, wherein
        the access by the retrieving section in the data management section to retrieve the vehicular information from the at least one vehicular functional device is inhibited by an access-inhibiting operation performed by the inhibiting section to prevent rebooting the at least one vehicular functional device on the electric vehicle from a low-power-consumption condition to a condition where the at least one vehicular functional device on the electric vehicle can perform communication with the external information system;
    and wherein the charge controller performs the charging operation on the electric vehicle by supplying power from the power source to the electric vehicle to charge a battery of the electric vehicle.

2. The charge controller for a vehicle claimed in claim 1, wherein
    the retrieving section retrieves various vehicular information relating to a plurality of controllers disposed on the electric vehicle.

3. The charge controller for a vehicle claimed in claim 1, wherein
    the data management section includes an inhibiting section which inhibits access to the electric vehicle, when the electric vehicle is not used before the charge control section performs the charging operation, and after the storing section stored the vehicular information in the storage device.

4. The charge controller for a vehicle claimed in claim 1, wherein
the data management section includes a cancelling section which cancels the inhibition in response to a use of the electric vehicle.

5. The charge controller for a vehicle claimed in claim 1, wherein
the supplying section, in a case of before the charge control section performs the charging operation and after the storing section stored the vehicular information in the storage device, selects a part from the vehicular information stored in the storage device and supplies the selected part to an external information system without access to the electric vehicle.

6. The charge controller for a vehicle claimed in claim 1, wherein
the retrieving section retrieves the vehicular information from the electric vehicle in response to an establishment of an electric connection to the electric needs to cancel the charge-start-instruction after the charge-start-instruction of the user on the information system.

7. The charge controller for a vehicle claimed in claim 1, wherein
the supplying section selects a part of the vehicular information based on a request from the information system.

8. The charge controller for a vehicle claimed in claim 1, wherein
the charge control section includes a standby section which starts the charging operation to the electric vehicle after a predetermined time period has elapsed after a charge-start-instruction of a user on the information system to start the charging operation, and wherein
the predetermined time period is longer than a time period which the user needs to cancel the charge-start-instruction after the charge-start-instruction of the user on the information system.

9. The charge controller for a vehicle claimed in claim 1, further comprising:
a relay which is capable of shutting electric power supply from the power source to the electric vehicle.

10. The charge controller for a vehicle claimed in claim 1, further comprising:
a connecting device which is capable of connecting with the power source; and
a connecting device which is capable of connecting with the electric vehicle.

11. The charger controller for a vehicle claimed in claim 1, wherein the at least one vehicular functional device includes at least one of an air-conditioner, a self-diagnosis device, a vehicle navigation device, and an audio device.

12. A charge controller for a vehicle, which is disposed between an electric vehicle and a power source, the charge controller comprising:
a charge control section which controls, with at least one of processor, a charging operation from the power source to the electric vehicle;
a storage device, located within the charge controller, which is capable of storing vehicular information including charging information relevant to the charging operation and a non-charging information irrelevant to the charging operation; and
a data management section which controls, with the at least one of processor, the storage device, the data management section includes:
a retrieving section which retrieves the vehicular information from the electric vehicle;
a storing section which stores the vehicular information retrieved by the retrieving section in the storage device; and
a supplying section which selects a part from the vehicular information stored in the storage device, and supplies the selected part to an external information system; and
an inhibiting section which inhibits access by the retrieving section in the data management section to retrieve the vehicular information from at least one vehicular functional device located on the electric vehicle, when the electric vehicle is unused before the charge control section performs the charging operation, and after the storing section has already stored the vehicular information retrieved by the retrieving section in the storage device,
the supplying section, in a case of after the charge control section performed the charging operation and after the storing section stored the vehicular information in the storage device, selects a part from the vehicular information stored in the storage device and supplies the selected part to an external information system without access to the electric vehicle, wherein
the access by the retrieving section in the data management section to retrieve the vehicular information from the at least one vehicular functional device is inhibited by an access-inhibiting operation performed by the inhibiting section to prevent rebooting the at least one vehicular functional device on the electric vehicle from a low-power-consumption condition to a condition where the at least one vehicular functional device on the electric vehicle can perform communication with the external information system;
and wherein the charge controller performs the charging operation on the electric vehicle by supplying power from the power source to the electric vehicle to charge a battery of the electric vehicle.

13. The charge controller for a vehicle claimed in claim 12, wherein
the retrieving section retrieves various vehicular information relating to a plurality of controllers disposed on the electric vehicle.

14. The charge controller for a vehicle claimed in claim 12, wherein
the data management section includes a cancelling section which cancels the inhibition in response to a use of the electric vehicle.

15. The charge controller for a vehicle claimed in claim 12, wherein
the supplying section, in a case of before the charge control section performs the charging operation and after the storing section stored the vehicular information in the storage device, selects a part from the vehicular information stored in the storage device and supplies the selected part to an external information system without access to the electric vehicle.

16. The charge controller for a vehicle claimed in claim 12, wherein
the retrieving section retrieves the vehicular information from the electric vehicle in response to an establishment of an electric connection to the electric needs to cancel the charge-start-instruction after the charge-start-instruction of the user on the information system.

17. The charge controller for a vehicle claimed in claim 12, wherein the supplying section selects a part of the vehicular information based on a request from the information system.

18. The charge controller for a vehicle claimed in claim 12, wherein the charge control section includes a standby section which starts the charging operation to the electric vehicle after a predetermined time period has elapsed after a charge-start-instruction of a user on the information system to start the charging operation, and wherein the predetermined time period is longer than a time period which the user needs to cancel the charge-start-instruction after the charge-start-instruction of the user on the information system.

19. The charge controller for a vehicle claimed in claim 12, further comprising:

a relay which is capable of shutting electric power supply from the power source to the electric vehicle.

20. The charge controller for a vehicle claimed in claim 12, further comprising:

a connecting device which is capable of connecting with the power source; and a connecting device which is capable of connecting with the electric vehicle.

* * * * *